US009049566B2

(12) United States Patent
Gou et al.

(10) Patent No.: US 9,049,566 B2
(45) Date of Patent: Jun. 2, 2015

(54) METHOD AND DEVICE FOR RECEIVING MBMS BY A UE IN CARRIER AGGREGATION

(75) Inventors: Wei Gou, Shenzhen (CN); Zijiang Ma, Shenzhen (CN); Shuqiang Xia, Shenzhen (CN); Bin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 171 days.

(21) Appl. No.: 13/988,271

(22) PCT Filed: Nov. 3, 2011

(86) PCT No.: PCT/CN2011/081755
§ 371 (c)(1),
(2), (4) Date: Jul. 10, 2013

(87) PCT Pub. No.: WO2012/065517
PCT Pub. Date: May 24, 2012

(65) Prior Publication Data
US 2013/0308519 A1    Nov. 21, 2013

(30) Foreign Application Priority Data

Nov. 18, 2010   (CN) .......................... 2010 1 0549163

(51) Int. Cl.
*H04H 20/71*    (2008.01)
*H04W 4/06*    (2009.01)
*H04L 5/00*    (2006.01)
(Continued)

(52) U.S. Cl.
CPC .................. *H04W 4/06* (2013.01); *H04L 5/001* (2013.01); *H04L 5/003* (2013.01); *H04W 72/00* (2013.01); *H04L 5/0098* (2013.01);
(Continued)

(58) Field of Classification Search
CPC ........ H04W 4/06; H04W 72/00; H04L 5/001; H04L 5/003; H04L 5/0098; H04L 5/0069; H04L 12/1845; H04L 12/1877
See application file for complete search history.

(56) References Cited

U.S. PATENT DOCUMENTS 8,750,191 B2 *   6/2014   Wu ............................... 370/312
2010/0267394 A1 * 10/2010   Wu ............................... 455/450
(Continued)

FOREIGN PATENT DOCUMENTS

CN          101257649 A       9/2008
CN          101296027 A      10/2008
(Continued)

OTHER PUBLICATIONS

International Search Report in international application No. PCT/CN2011/081755, mailed on Feb. 23, 2012.
(Continued)

*Primary Examiner* — Kevin Mew
(74) *Attorney, Agent, or Firm* — Oppedahl Patent Law Firm LLC

(57) ABSTRACT

The disclosure discloses a method and device for receiving an MBMS by a UE in carrier aggregation, including that: a User Equipment (UE) with MBMS capability determines all Component Carriers (CC) that can be received by the UE at the UE's geographic location; the UE determines an MBMS-bearing CC in the all CCs; and the UE receives the MBMS from the MBMS-bearing CC. By the disclosure, the problem of incapability of the UE to receive the MBMS from the CC due to the network side not knowing the requirement of the UE for receiving the MBMS can be solved.

13 Claims, 3 Drawing Sheets

(51) Int. Cl.
*H04L 12/18* (2006.01)
*H04W 72/00* (2009.01)

(52) U.S. Cl.
CPC ......... *H04L 5/0069* (2013.01); *H04L 12/1845* (2013.01); *H04L 12/1877* (2013.01); *H04L 12/189* (2013.01)

(56) References Cited

U.S. PATENT DOCUMENTS

| | | | |
|---|---|---|---|
| 2011/0070845 A1* | 3/2011 | Chen et al. ...................... | 455/91 |
| 2011/0076962 A1* | 3/2011 | Chen et al. ...................... | 455/68 |
| 2011/0159799 A1* | 6/2011 | Chen et al. ................... | 455/3.01 |
| 2011/0164549 A1 | 7/2011 | Huang et al. | |
| 2011/0228724 A1* | 9/2011 | Gaal et al. ..................... | 370/328 |
| 2011/0243056 A1* | 10/2011 | Jen ................................ | 370/312 |
| 2011/0273992 A1* | 11/2011 | Zhang et al. .................. | 370/241 |
| 2012/0039252 A1* | 2/2012 | Damnjanovic et al. ....... | 370/328 |
| 2012/0300732 A1* | 11/2012 | Ode .............................. | 370/329 |
| 2013/0223406 A1* | 8/2013 | Vujcic .......................... | 370/331 |

FOREIGN PATENT DOCUMENTS

| | | |
|---|---|---|
| CN | 101677311 A | 3/2010 |
| CN | 101742410 A | 6/2010 |

OTHER PUBLICATIONS

English Translation of the Written Opinion of the International Search Authority in international application No. PCT/CN2011/081755, mailed on Feb. 23, 2012.

* cited by examiner

US 9,049,566 B2

METHOD AND DEVICE FOR RECEIVING MBMS BY A UE IN CARRIER AGGREGATION

TECHNICAL FIELD

The disclosure relates to a multi-carrier aggregation system and in particular to a method and device for receiving a Multimedia Broadcast Multicast Service (MBMS) by a User Equipment (UE) in carrier aggregation.

BACKGROUND

With the rapid development of the internet and popularization of large screen multifunctional mobile terminals such as mobile phones, many mobile data multimedia services and various high bandwidth multimedia services, such as video conferencing, telecasting, video-on-demand, video advertisement, on-line education, interactive gaming, and the like, emerge, not only meeting the rising service requirement of mobile users, but also bringing new service growth point for a mobile operator. These mobile data multimedia services require that the same data can be received by multiple users simultaneously, and are characteristic of large data sizes, long duration, time-delay sensibility, and the like compared with an ordinary data service. In order to utilize mobile network resources effectively, the $3^{rd}$ Generation Partnership Project (3GPP) proposes a Multimedia Broadcast Multicast Service (MBMS) which is a technique of transferring data from one data source to multiple targets, realizing resource sharing of a network including a core network and an access network and enhancing the utilization rate of network resources especially air interface resources. The MBMS defined by 3GPP can implement not only plain-text-low-speed-message-type multicasting and broadcasting, but also high-speed-multimedia-service's broadcasting and multicasting, providing all kinds of abundant video, audio, and multimedia services, which doubtlessly conforms to the trend for future mobile data development and provides a better service prospect for development of the $3^{rd}$ Generation (3G) digital communications.

In LTE-Advanced (LTE-A), multi-carrier aggregation is introduced, namely, there are multiple carriers of different (continuous or discrete) frequencies (frequency bands); a network side uses two or more carriers simultaneously to send data for one UE, which receives data on two or more carriers simultaneously. According to the current progress of standard-making, the following conclusions are adopted by standardization organizations and are written into corresponding protocols.

The multi-carrier aggregation technology specification is as follows:
- each UE supports aggregation of at least 2 Component Carriers (CC);
- a network side allocates for the UE and indicates which one is the Primary Cell (Pcell) of the UE, and which ones are the Secondary Cells (Scell) of the UE;
- a UE in an idle state stays in its Pcell;
- the Pcell always remains in an activated state;
- the network side can close (or deactivate) and open (or activate) an Scell of the UE;
- the UE does not receive a Physical Downlink Control Channel (PDCCH) in a closed Scell;
- the UE does not receive a Physical Downlink Shared Channel (PDSCH) in the closed Scell;
- the UE does not perform downlink carrier Channel Quality Indicator (CQI) measurement in the closed Scell;
- the initial default state of an Scell is the deactivated state;
- the UE receives a Broadcast Control Channel (BCCH) and a Paging message only in the Pcell.

Based on the aforementioned conclusions, we analyzed and found the following issues, specifically as follows:

Assuming an MBMS is being sent from a Multimedia Broadcast multicast service Single Frequency Network (MBSFN) area, and assuming further that within the MBSFN area, there are multiple CCs in some cells, in which CC2 is being used to send the MBMS in an MBSFN manner, it can be assumed that there are 3 CCs, noted as CC1, CC2, and CC3, respectively, in the cell(s). It can be assumed further that in the cell(s), the Pcells of some UEs are configured to be CC2, the Pcells of some UEs are CC1 or CC3, that is, for some UEs, CC2 is their Scell.

The aforementioned scenario is a very common one in a system with carrier aggregation as the main technique, which scenario however, according to existing carrier aggregation criterion requirement, has a certain problem in that a network side can configure, open, and close the UE's Scell for the UE, and the current condition for opening and closing Scells is determined based on a requirement related to a unicast service without considering requirements relevant to an MBMS. Then, if the network side closes Scells of some UEs, which Scells are CC2, then those UEs, according to existing technical criterion requirement, can not receive a PDCCH, a PDSCH, a BCCH, a paging message, and the like in their closed Scells (CC2), which limitation eventually leads to incapability of the UEs to receive an MBMS on their CC2. The reason of this is that the UEs can not receive a PDCCH and a BCCH in a closed Scell, and the network side does not know the relevant information on receiving of an MBMS by the UEs, that is, whether the UEs are receiving the MBMS, nor the state of the UEs (a connected state or an idle state), thus when closing an Scell, the network side does not refer to the MBMS receiving circumstance of the UEs, which leads to the aforementioned problem.

Another circumstance will also result in incapability of receiving an MBMS by a UE, namely, the UE wants to receive an MBMS on a certain CC bearing the MBMS, which however is not included in the CCs allocated to the UE by the network side. Thus, according to provisions of existing technical criterion, the UE can not receive the MBMS from the CC, which mainly is caused because the network side does not know the receiving requirement of the UE.

From the above analysis, the present disclosure proposes the following perfecting technical solution to implement receiving of the MBMS by the UE in a multi-carrier system.

SUMMARY

In view of the above, the main objective of the disclosure is to provide a method and device for receiving an MBMS by a UE in carrier aggregation, to perfect the existing technique for a UE to receive an MBMS from a CC, and to solve the problem that a UE is incapable of receiving an MBMS from a CC because a network side does not know the need of the UE for receiving the MBMS.

To implement the aforementioned objective, the technical solution of the present disclosure is implemented as follows.

The present disclosure provides a method for receiving an MBMS by a UE in carrier aggregation, including:

determining, by a User Equipment (UE) with MBMS capability, all Component Carriers (CCs) that can be received by the UE at UE's geographic location;

determining, by the UE, an MBMS-bearing CC in the all CCs; and receiving, by the UE, an MBMS on the MBMS-bearing CC.

Furthermore, the step of determining, by the UE, an MBMS-bearing CC in the all CCs may include:

receiving, by the UE, a Broadcast Control Channel (BCCH) sent in each of the all CCs that can be received according to a relation between a CC and the UE itself, and determining, by the UE, the MBMS-bearing CC according to the BCCH; or informing, by a network side, the UE of the MBMS-bearing CC in the all CCs via a Primary Cell (Pcell) of the UE; receiving, by the UE, the BCCH sent in each MBMS-bearing CC according to the relation between a CC and the UE itself.

Furthermore, the BCCH may at least include a system information block 13 (SIB13).

Furthermore, the step of determining an MBMS-bearing CC according to the BCCH may include:

determining, by the UE, whether a configuration parameter of a Multicast Control Channel (MCCH) is included in the SIB13 of a CC; and if the configuration parameter is included in the SIB13 of the CC, determining, by the UE, that the CC has an MBMS to send; otherwise determining, by the UE, that the CC has no MBMS to send.

Furthermore, the step of receiving, by the UE, an MBMS on the MBMS-bearing CC may be:

determining, by the UE, a position of the MCCH according to the configuration parameter of the MCCH in the SIB13 of the CC, and receiving, by the UE, MCCH information; and receiving, by the UE, Multicast channel Scheduling Information (MSI) and a Multicast Traffic Channel (MTCH) in a Physical Multicast Channel (PMCH) according to the MCCH information, and completing receiving the MBMS.

Furthermore, the relation between a CC and the UE may include:

the CC is configured as the Pcell of the UE; and/or the CC is configured as a Secondary Cell (Scell) of the UE and the Scell is in an activated state; and/or the CC is configured as an Scell of the UE and the Scell is in an deactivated state; and/or the CC is not configured as the Pcell or an Scell of the UE.

Furthermore, when a CC is configured as the Pcell of the UE, or the CC is configured as an Scell of the UE and the Scell is in the activated state, or the CC is configured as an Scell of the UE and the Scell is in the deactivated state, or the CC is not configured as the Pcell or an Scell of the UE, the UE receives a BCCH sent in the CC, which is implemented as follows: the UE receives the BCCH from the CC directly.

Furthermore, when a CC is configured as the Pcell of the UE, or the CC is configured as an Scell of the UE and the Scell is in the activated state, the UE receives a BCCH sent in the CC, which is implemented as follows:

the network side sends a BCCH sent in the CC required to be received to the UE via the Pcell of the UE.

The present disclosure further provides a device for receiving an MBMS, applied to a UE receiving the MBMS in carrier aggregation, including:

an analyzing module configured to determine all Component Carriers (CC) that can be received by the UE at UE's geographic location and to determine an MBMS-bearing CC in the all CCs; and a receiving module configured to receive an MBMS on the MBMS-bearing CC.

Furthermore, the receiving module may be further configured to receive a Broadcast Control Channel (BCCH) sent in each of the all CCs that can be received by the UE according to a relation between a CC and the UE, and the analyzing module determines the MBMS-bearing CC according to the BCCH; and the receiving module may be further configured to receive the BCCH sent in each MBMS-bearing CC according to a relation between the UE and each MBMS-bearing CC in the all CCs, which is informed by a network side via a Primary Cell (Pcell) of the UE.

Furthermore, the BCCH may at least include a system information block 13 (SIB13).

Furthermore, the analyzing module may be further configured to determine whether a configuration parameter of a Multicast Control Channel (MCCH) is included in the SIB13 of a CC, and if the configuration parameter is included in the SIB13 of the CC, to determine that the CC has an MBMS to send, otherwise determine that the CC has no MBMS to send.

Furthermore, the receiving module may be further configured to determine a position of the MCCH according to a configuration parameter of the MCCH in the SIB13 of the CC, and receive MCCH information; and receive Multicast channel Scheduling Information (MSI) and a Multicast Traffic Channel (MTCH) in a Physical Multicast Channel (PMCH) according to the MCCH information, and completing receiving the MBMS.

With the solution of receiving an MBMS according to the present disclosure, it is implemented that a UE receives an MBMS in Pcell (a corresponding CC) that is not its Pcell, thereby realizing that the MBMS can be received in each CC at any time by the UE in a multi-carrier system, and a network side is not required to configure a CC bearing the MBMS required to be received by the UE as the Pcell of the UE, realizing that reception of the MBMS in the CC by the UE is independent of whether the CC bearing the MBMS required to be received by the UE is configured by the network side as the Pcell or an Scell of the UE.

DETAILED DESCRIPTION

The technical solution of the present disclosure is further elaborated below with reference to the figures and specific embodiments.

Figure 1:
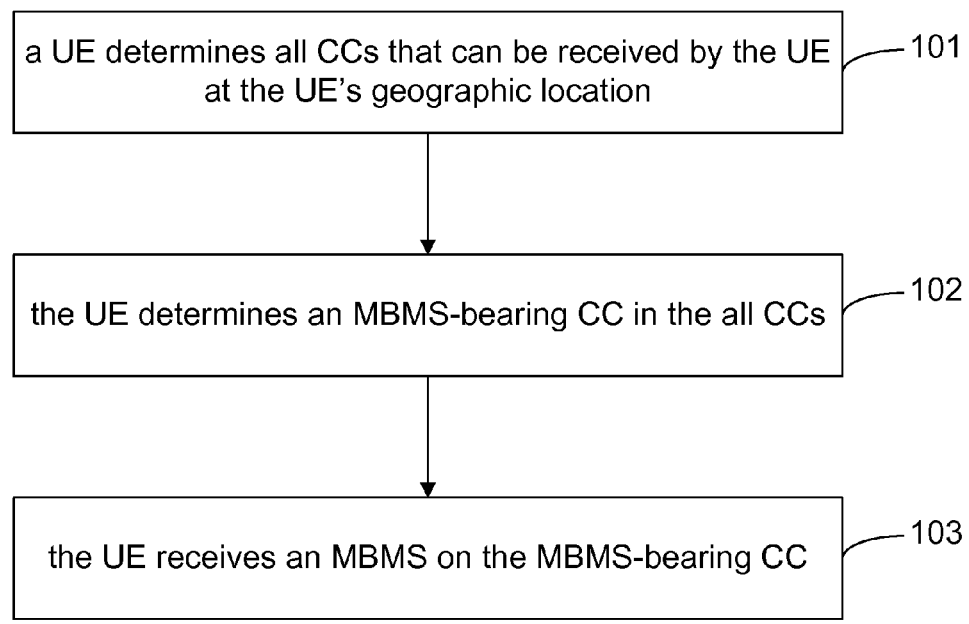
FIG. 1 is a flowchart of the method for receiving an MBMS by a UE in carrier aggregation according to the present disclosure.
Figure 2:
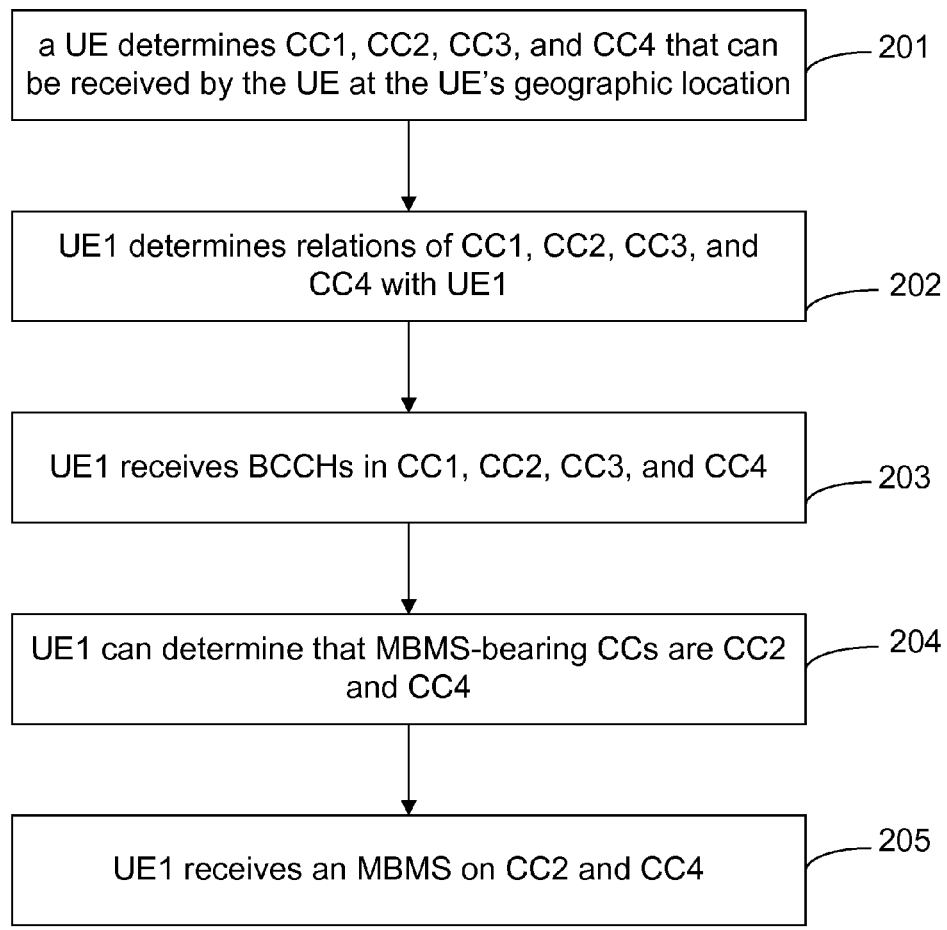
FIG. 2 is a flowchart of the method for receiving an MBMS by a UE according to Embodiment 1 of the present disclosure.
Figure 3:
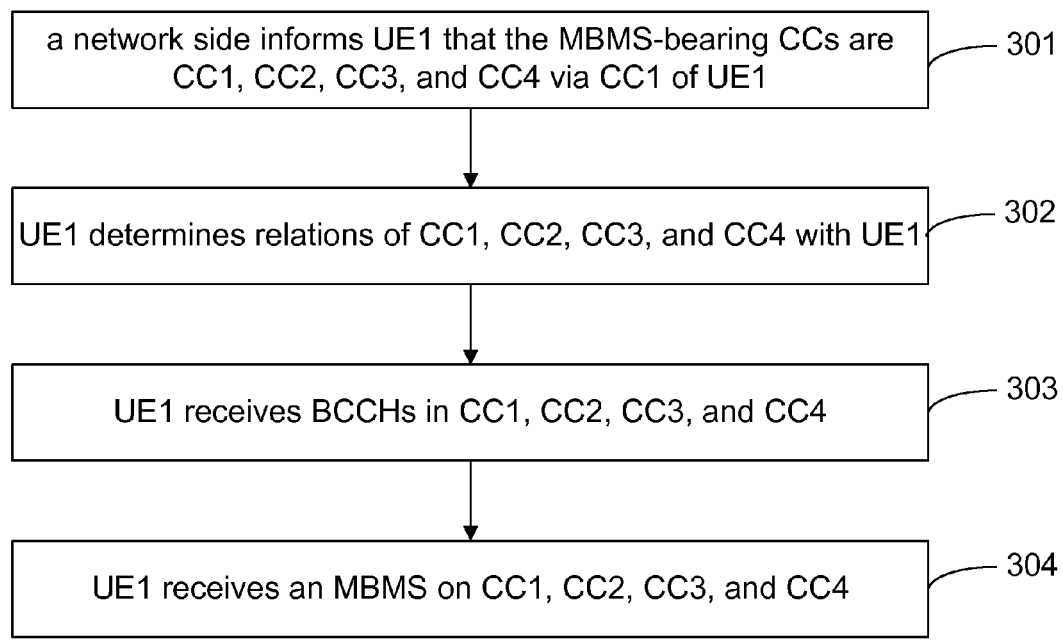
FIG. 3 is a flowchart of the method for receiving an MBMS by a UE according to Embodiment 2 of the present disclosure.

As shown in FIG. 1, the method for receiving an MBMS by a UE in carrier aggregation according to the present disclosure includes the following steps.

Step 101: a UE determines all CCs that can be received by the UE at the UE's geographic location.

The UE according to the present disclosure is one capable of receiving an MBMS and aggregate multi-carriers.

The UE can receive one or more CCs at one geographic location. According to provisions of multi-carrier aggregation, one CC corresponds to one cell. One of these CCs is configured as a Primary Cell (Pcell) of the UE; and there may be multiple CCs configured as Secondary Cells (Scell) of the UE, or the UE may have no Scell.

Step 102: the UE determines an MBMS-bearing CC in the all CCs.

Implementation here is divided into two cases:

case 1: the UE receives the BCCH sent in each CC according to the relation between each CC in the all CCs and the UE itself, and determines, according to the BCCH, the MBMS-bearing CC therein. The BCCH at least includes SIB13, and may further include MIB and SIB1; after receiving the BCCH sent in a certain CC, the UE determines whether a configuration parameter of a Multicast Control Channel (MCCH) is included in the SIB13, and if the configuration parameter is included, determines that the CC has an MBMS to send, namely, bears an MBMS; otherwise determines that the CC has no MBMS to send.

case 2: a network side directly informs the UE of the MBMS-bearing CC in the all CCs via the Pcell the UE; the UE receives the BCCH sent in each MBMS-bearing CC according to the relation between each MBMS-bearing CC and the UE itself.

The aforementioned relation between a CC and the UE has the following cases:

the CC is configured as the Pcell of the UE; and/or the CC is configured as a Secondary Cell (Scell) of the UE and the Scell is in an activated state; and/or the CC is configured as an Scell of the UE and the Scell is in an deactivated state; and/or the CC is not configured as the Pcell or an Scell of the UE.

According to the aforementioned relation between a CC and the UE: when the CC is configured as the Pcell of the UE, or the CC is configured as an Scell of the UE and the Scell is in the activated state, or the CC is configured as an Scell of the UE and the Scell is in the deactivated state, or the CC is not configured as the Pcell or an Scell of the UE, the UE receives the BCCH sent in the CC, which is implemented as follows: the UE uses its carrier aggregation capability to directly receives the BCCH sent in the CC (if the UE has enough carrier aggregation capability to support the receiving from the CC by using the aggregation technology).

When the CC is configured as the Pcell of the UE, or the CC is configured as an Scell of the UE and the Scell is in the activated state, the UE receives the BCCH sent in the CC, which is implemented as follows: the network side sends, via the Pcell of the UE, the UE the BCCH sent in the CC required to be received.

Step 103: the UE receives an MBMS on the MBMS-bearing CC.

After determining the MBMS-bearing CC, the UE receives an MBMS on the CC.

As the UE has received the BCCH sent in the CC (the scenario and manner in which the UE receives the BCCH is as described in Step 102 and is not further elaborated here), the UE determines the position of an MCCH according to a configuration parameter of the MCCH in the SIB13, and receives MCCH information; and then the UE receives Multicast channel Scheduling Information (MSI) and a Multicast Traffic Channel (MTCH) in a Physical Multicast Channel (PMCH) according to the MCCH information, thereby completing reception of the MBMS.

Moreover, the CC bearing the MBMS that the UE is interested in can be determined by selecting the MBMS that the UE is interested in according to an MBMS electronic playlist provided by the UE, and then determining the CC bearing the selected MBMS according to MBMS-relevant information in the electronic playlist.

For a unicast service, namely, a non-MBMS service, the UE can not receive a BCCH or a PDCCH in its Scell, thereby facilitating scheduling at a network side and UE energy conservation. In the present disclosure, for an MBMS, the reason that the UE is allowed to receive a BCCH in its Scell is that the MBMS is a unidirectional downlink service, and the UE does not need to perform uplink interaction with the network side, so it is convenient to receive a BCCH directly from the Scell of the UE (the UE uses its carrier aggregation capability here) and facilitates the UE in conserving energy.

In aforementioned manner, it is implemented that the UE receives an MBMS in a Pcell (a corresponding CC) that is not its own Pcell, thereby realizing that the UE can receive the MBMS in each CC at any time in the multi-carrier system, and the network side is not required to configure the CC bearing the MBMS required to be received by the UE as the Pcell of the UE, and realizing that the reception of the MBMS in the CC by the UE is independent of whether the CC bearing the MBMS required to be received by the UE is configured by the network side as the Pcell or an Scell of the UE. Thus, the burden of the network side in carrier configuration for the UE is reduced.

The aforementioned method according to the present disclosure is described below with specific embodiments.

Embodiment 1

Assuming each of one or more cells constituting a certain MBSFN area has multiple carriers, and the CCs therein that participate in MBMS sending within the MBSFN area are CC2 and CC4. In order to facilitate description that follows, the following is agreed on: within the MBSFN area, there is one UE (noted as UE1) that needs to receive an MBMS, and UE1 can receive CC1, CC2, CC3 and CC4 at the current geographic location, wherein CC2 is configured as the Pcell of UE1, CC1 and CC3 are configured as Scells of UE1; wherein, CC1 is in the activated state, CC3 is in the deactivated state; CC4 is neither an Scell nor the Pcell of UE1.

According to the method of the disclosure, the process of UE1 receiving an MBMS is:

Step 201: UE1 first determines which CCs can be received by UE1 at its current geographic location, and the result of the determination is CC1, CC2, CC3, and CC4;

Step 202: UE1 determines relations of CC1, CC2, CC3, and CC4 with UE1 itself, and it can be known that CC2 is configured as the Pcell of UE1, CC1 in the activated state and CC3 in the deactivated state are configured as Scells of UE1, and CC4 is neither an Scell nor the Pcell of UE1;

Step 203: UE1 receives BCCHs sent in CC1, CC2, CC3, and CC4; if the current CC is configured as the Pcell of the UE, or the CC is configured as an Scell of the UE and is in the activated state, or the CC is configured as an Scell of the UE and is in the deactivated state, or the CC is not configured as the Pcell or an Scell of the UE. UE1 can always receive a BCCH sent in a CC from the CC directly; Therefore, UE1 receives corresponding BCCHs directly from CC1, CC2, CC3, and CC4;

when receiving the BCCH, UE1 may receive just MIB, SIB1, and SIB13, so as to avoid UE1 from receiving a system information block irrelevant to the MBMS;

Step 204: UE1 can determine that MBMS-bearing CCs in CC1 to CC4 are CC2 and CC4, in the same way as described in Step 102, which will not be elaborated further here;

Step 205: UE1 receives the MBMS from CC2 and CC4; specifically, taking CC2 as an example, the position of an MCCH in CC2 can be obtained according to the configuration parameter of the MCCH in SIB13 of CC2, then MCCH information is received, and the MSI and MTCH are received in an PMCH of CC2 according to the MCCH information, and then the reception of the MBMS is completed.

The process of receiving an MBMS from CC4 is the same as receiving an MBMS from CC2 and will not be further elaborated here.

Thus, it can be seen that according to the method of the disclosure, UE1 can receive a BCCH directly from a CC disregarding the Pcell and Scells configured for UE1 by the network side, hereby determining an MBMS-bearing CC and receiving an MBMS from the CC.

Embodiment 2

Assuming each of one or more cells constituting a certain MBSFN area has multiple carriers, and the CCs therein that participate in MBMS sending within the MBSFN area are CC1 to CC4. In order to facilitate description that follows, the following is agreed on: within the MBSFN area, there is one UE (noted as UE1) that needs to receive the MBMS, and UE1 can receive CC1 to CC4 at the current geographic location, wherein CC1 is configured as the Pcell of UE1, CC2 and CC3 are configured as Scells of UE1; wherein, CC2 is in the activated state, CC3 is in the deactivated state; CC4 is neither an Scell nor the Pcell of UE1.

According to the method of the disclosure, the process of UE1 receiving an MBMS is:

Step 301: UE1 first determines CCs that can be received by UE1 at the current geographic location of UE1, namely, CC1, CC2, CC3, and CC4; a network side informs UE1 via the Pcell of UE1 (i.e., CC1) that the MBMS-bearing CCs are CC1 to CC4;

Step 302: UE1 determines relations of the MBMS-bearing CC1, CC2, CC3, and CC4 with UE1, and it can be known that CC1 is configured as the Pcell of UE1, CC2 and CC3 are configured as Scells of UE1, wherein CC2 is in the activated state and CC3 is in the deactivated state; CC4 is neither an Scell nor the Pcell of UE1;

Step 303: UE1 receives the BCCHs sent in CC1, CC2, CC3, and CC4, which specifically is:

if the CC to be received by the UE is configured as the Pcell of the UE, or the CC is configured as an Scell of the UE and is in the activated state, or the CC is configured as an Scell of the UE and is in the deactivated state, or the CC is not configured as the Pcell or any Scell of the UE, namely, if in the case of CC1 to CC4, then UE1 can receive corresponding BCCHs directly from CC1, CC2, CC3, and CC4 without the need to ask the network side for configuration; when receiving the BCCHs, UE1 can receive just MIB, SIB1, and SIB13, so as to avoid UE1 from receiving a system information block irrelevant to the MBMS;

in addition, for the case when the CC is configured as the Pcell of the UE, or the CC is configured as an Scell of the UE and the Scell is in the activated state, namely, in the case of CC1 and CC2, then the BCCHs sent in CC1 and CC2 can also be sent to UE1 by the network side via the Pcell of UE1 (namely, CC1), where to the network side can send just MIB, SIB1, and SIB13;

Step 304: UE1 receives the MBMS from CC1, CC2, CC3, and CC4; specifically, taking CC2 as an example, the position of an MCCH in CC2 can be obtained according to the configuration parameter of the MCCH in SIB13 of CC2, then MCCH information is received, and the MSI and MTCH are received in a PMCH of CC2 according to the MCCH information, and then the reception of the MBMS is completed.

The process of receiving an MBMS from CC1, CC3, and CC4 is the same as receiving an MBMS from CC2 and will not be further elaborated here.

Thus, it can be seen that according to the method of the disclosure, UE1 can receive a BCCH directly from a CC disregarding the Pcell and Scells configured for UE1 by the network side, hereby determining an MBMS-bearing CC and receiving an MBMS from the CC.

To implement the aforementioned method for receiving an MBMS, the present disclosure provides a device for receiving an MBMS, which is applied to a UE receiving an MBMS in carrier aggregation, including:

an analyzing module configured to determine all Component Carriers (CC) that can be received by the UE at the UE's geographic location and to determine an MBMS-bearing CC in the all CCs; and a receiving module configured to receive an MBMS on the MBMS-bearing CC.

Wherein, the receiving module is futher configured to receive a BCCH sent in each CC that can be received by the UE according to relations of the CCs with the UE, and the analyzing module determines the MBMS-bearing CC according to the BCCH; and the receiving module is further configured to receive the BCCH sent in each MBMS-hearing CC according to the relation between the UE and each MBMS-bearing CC in the all CCs, which is, informed by a network side via a Pcell of the UE.

The BCCH at least includes SIB13, and may further includes MIB and SIB1.

The analyzing module is further configured to determine whether a configuration parameter of a Multicast Control Channel (MCCH) is included in SIB13 of a CC, and if the configuration parameter is included, determine that the CC has an MBMS to send, otherwise determine that the CC has no MBMS to send.

The receiving module is further configured to determine the position of the MCCH according to a configuration parameter of the MCCH in the SIB13 of the CC, and receive MCCH information; and receive MSI and an MTCH in a PMCH according to the MCCH information, and then complete receiving the MBMS.

What described are merely preferred embodiments of the disclosure and thus are not intended to limit the patent scope of the disclosure

The invention claimed is:

1. A method for receiving a Multimedia Broadcast Multicast Service (MBMS) by a UE in carrier aggregation, comprising:

determining, by a User Equipment (UE) with MBMS capability, all Component Carriers (CCs) that can be received by the UE at UE's geographic location;

determining, by the UE, an MBMS-bearing CC in the all CCs; and receiving, by the UE, an MBMS on the MBMS-bearing CC;

wherein the determining, by the UE, an MBMS-bearing CC in the all CCs comprises:

receiving, by the UE, a Broadcast Control Channel (BCCH) sent in each of the all CCs that can be received according to a relation between a CC and the UE itself, and determining, by the UE, the MBMS-bearing CC according to the BCCH; or informing, by a network side, the UE of the MBMS-bearing CC in the all CCs via a Primary Cell (PCell) of the UE: receiving, by the UE, the BCCH sent in each MBMS-bearing CC according to the relation between a CC and the UE itself.

2. The method for receiving an MBMS by a UE in carrier aggregation according to claim 1, wherein the BCCH at least comprises a system information block 13 (SIB13).

3. The method for receiving an MBMS by a UE in carrier aggregation according to claim 2, wherein the determining an MBMS-bearing CC according to the BCCH comprises:
determining, by the UE, whether a configuration parameter of a Multicast Control Channel (MCCH) is included in the SIB13 of a CC; and if the configuration parameter is included in the SIB13 of the CC, determining, by the UE, that the CC has an MBMS to send; otherwise determining, by the UE, that the CC has no MBMS to send.

4. The method for receiving an MBMS by a UE in carrier aggregation according to claim 2, wherein the receiving, by the UE, an MBMS on the MBMS-bearing CC comprises:
determining, by the UE, a position of the MCCH according to the configuration parameter of the MCCH in the SIB13 of the CC, and receiving, by the UE, MCCH information; and
receiving, by the UE, Multicast channel Scheduling Information (MSI) and a Multicast Traffic Channel (MTCH) in a Physical Multicast Channel (PMCH) according to the MCCH information, and completing receiving the MBMS.

5. The method for receiving an MBMS by a UE in carrier aggregation according to claim 1, wherein the relation between a CC and the UE comprises:
the CC is configured as the Pcell of the UE; and/or
the CC is configured as a Secondary Cell (Scell) of the UE and the Scell is in an activated state; and/or
the CC is configured as an Scell of the UE and the Scell is in an deactivated state; and/or
the CC is not configured as the Pcell or an Scell of the UE.

6. The method for receiving an MBMS by a UE in carrier aggregation according to claim 5, wherein when the CC is configured as the Pcell of the UE, or the CC is configured as an Scell of the UE and the Scell is in the activated state, or the CC is configured as an Scell of the UE and the Scell is in the deactivated state, or the CC is not configured as the Pcell or an Scell of the UE, the UE receives a BCCH sent in the CC, which is implemented as follows: the UE receives the BCCH from the CC directly.

7. The method for receiving an MBMS by a UE in carrier aggregation according to claim 5, wherein when the CC is configured as the Pcell of the UE, or the CC is configured as an Scell of the UE and the Scell is in the activated state, the UE receives a BCCH sent in the CC, which is implemented as follows: the network side sends a BCCH sent in the CC to the UE via the Pcell of the UE.

8. A device for receiving a Multimedia Broadcast Multicast Service (MBMS), applied to a Multimedia Broadcast Multicast Service (MBMS) receiving an MBMS in carrier aggregation, comprising:
an analyzing module configured to determine all Component Carriers (CC) that can be received by the UE at UE's geographic location and to determine an MBMS-bearing CC in the all CCs; and
a receiving module configured to receive an MBMS on the MBMS-bearing CC;
wherein the receiving module is further configured to receive a Broadcast Control Channel (BCCH) sent in each of the all CCs that can be received by the UE according to a relation between a CC and the UE, and the analyzing module determines the MBMS-bearing CC according to the BCCH; and
the receiving module is further configured to receive the BCCH sent in each MBMS-bearing CC according to a relation between the UE and each MBMS-bearing CC in the all CCs, which is informed by a network side via a Primary Cell (Pcell) of the UE.

9. The device for receiving an MBMS according to claim 8, wherein the BCCH at least comprises a system information block 13 (SIB13).

10. The device for receiving an MBMS according to claim 9, wherein the analyzing module is further configured to determine whether a configuration parameter of a Multicast Control Channel (MCCH) is included in the SIB13 of a CC, and if the configuration parameter is included in the SIB13 of the CC, to determine that the CC has an MBMS to send, otherwise determine that the CC has no MBMS to send.

11. The device for receiving an MBMS according to claim 9, wherein
the receiving module is further configured to determine a position of the MCCH according to a configuration parameter of the MCCH in the SIB13 of the CC, and receive MCCH information; and receive Multicast channel Scheduling Information (MSI) and a Multicast Traffic Channel (MTCH) in a Physical Multicast Channel (PMCH) according to the MCCH information, and completing receiving the MBMS.

12. The method for receiving an MBMS by a UE in carrier aggregation according to claim 3, wherein the receiving, by the UE, an MBMS on the MBMS-bearing CC comprises:
determining, by the UE, a position of the MCCH according to the configuration parameter of the MCCH in the SIB13 of the CC, and receiving, by the UE, MCCH information; and
receiving, by the UE, Multicast channel Scheduling Information (MSI) and a Multicast Traffic Channel (MTCH) in a Physical Multicast Channel (PMCH) according to the MCCH information, and completing receiving the MBMS.

13. The device for receiving an MBMS according to claim 10, wherein
the receiving module is further configured to determine a position of the MCCH according to a configuration parameter of the MCCH in the SIB13 of the CC, and receive MCCH information; and receive Multicast channel Scheduling Information (MSI) and a Multicast Traffic Channel (MTCH) in a Physical Multicast Channel (PMCH) according to the MCCH information, and completing receiving the MBMS.

* * * * *